United States Patent
Kneer et al.

(10) Patent No.: US 12,409,598 B2
(45) Date of Patent: Sep. 9, 2025

(54) METHOD OF MANUFACTURING CONTAINERS

(71) Applicant: Gaplast GmbH, Altenau (DE)

(72) Inventors: Stephan Kneer, Farchant (DE); Uwe Bölz, Tutzing (DE); Kasim Yilginc, Oberammergau (DE)

(73) Assignee: Gaplast GmbH, Altenau (DE)

( * ) Notice: Subject to any disclaimer, the term of this patent is extended or adjusted under 35 U.S.C. 154(b) by 0 days.

(21) Appl. No.: 17/522,043

(22) Filed: Nov. 9, 2021

(65) Prior Publication Data

US 2022/0152907 A1 May 19, 2022

(30) Foreign Application Priority Data

Nov. 13, 2020 (DE) .................... 10 2020 129 996.6

(51) Int. Cl.
*B29C 49/22* (2006.01)
*B29C 49/02* (2006.01)
*B29C 49/04* (2006.01)
*B29C 49/42* (2006.01)
*B29K 101/12* (2006.01)
*B29L 31/00* (2006.01)

(52) U.S. Cl.
CPC ............ *B29C 49/22* (2013.01); *B29C 49/02* (2013.01); *B29C 49/04* (2013.01); *B29C 49/42* (2013.01); *B29C 2949/3088* (2022.05); *B29K 2101/12* (2013.01); *B29L 2031/712* (2013.01)

(58) Field of Classification Search
CPC ............ B29C 48/275; B29C 49/4284; B29L 2031/712
See application file for complete search history.

(56) References Cited

U.S. PATENT DOCUMENTS 4,647,509 A * 3/1987 Wallace ................. B32B 27/08
428/476.3
4,824,618 A 4/1989 Strum
(Continued)

FOREIGN PATENT DOCUMENTS

| EP | 1996384 B1 | 3/2011 | |
| EP | 3275652 A1 * | 1/2018 | ............ B29C 49/00 |
| JP | H09239023 A | 9/1997 | |

OTHER PUBLICATIONS

EP Search Report dated Feb. 15, 2022 for European patent application No. EP21209896.
(Continued)

*Primary Examiner* — Susan D Leong
*Assistant Examiner* — Timothy G Hemingway
(74) *Attorney, Agent, or Firm* — Greer, Burns & Crain, Ltd

(57) ABSTRACT

A method of manufacturing containers consisting of a substantially stiff outer container and a readily deformable inner bag of first and second thermoplastic plastic materials, where the inner bag is detached from the wall of the outer container, includes the step of the excess material is supplied again to the first screw conveyor, which mixes the excess material with the first thermoplastic plastic material and supplies it to the extruder nozzle, wherein the first thermoplastic plastic material has a lower viscosity in the molten state than the excess material so that the outer layer of the extruded tube consists only of the first thermoplastic plastic material.

7 Claims, 1 Drawing Sheet

(56) References Cited

U.S. PATENT DOCUMENTS

| | | | | |
|---|---|---|---|---|
| 7,585,452 B2* | 9/2009 | Kneer | ................. | B29C 49/22 |
| | | | | 264/529 |
| 8,404,755 B2* | 3/2013 | Sequeira | ............. | C08L 67/03 |
| | | | | 528/308.1 |
| 10,160,154 B2* | 12/2018 | Kunz | ................. | F16L 9/127 |
| 2020/0405243 A1 | 12/2020 | Yu et al. | | |

OTHER PUBLICATIONS

EP Search Report dated Nov. 9, 2022 for European patent application No. EP22178003.

* cited by examiner

METHOD OF MANUFACTURING CONTAINERS

PRIORITY CLAIM

The subject application claims convention priority to German patent application No. 10 2020 129 996.6 filed Nov. 13, 2020.

FIELD OF THE INVENTION

The invention relates to a method of continuously manufacturing containers consisting of a substantially stiff outer container and a readily deformable inner bag from first and second thermoplastic plastic materials, which do not form a weld connection with one another, wherein the first thermoplastic plastic material for the outer container is supplied to a first screw conveyor and the second thermoplastic plastic material for the inner bag is supplied to a second screw conveyor, which are connected to an extruder nozzle, which coextrudes a preform consisting of two tubes, which is arranged between the open halves of a blow mould, wherein the blow mould is closed, when the preform has the length necessary for the manufacture of the container, wherein excess material in the base region of the container to be manufactured is squeezed out and a web is formed from welded material of the outer container, in which the welded base seam of the inner bag is clamped and held in the axial direction and wherein the preform is inflated by a pressure medium into engagement with the wall of the blow mould and is removed from the blow mould, whereafter the inner bag is detached from the wall of the outer container.

BACKGROUND

Such a method is disclosed in EP 1 996 384 B1, which is incorporated by reference herein, which is concerned with how the inner bag of the container is completely detached from the wall of the outer container, which is a prerequisite for the container contents being able subsequently to be completely discharged out of the container opening. The inner bag may not form a weld connection with the outer bag at any point since it would otherwise not be able to be completely detached.

SUMMARY OF THE INVENTION

In the prior method, the excess material squeezed out at the base region of the container to be manufactured, which consists of welded material of the outer container and material of the inner bag clamped between it, is discarded or delivered to third parties for inferior applications. Since, in the described method, a considerable amount of excess material is produced, which is removed from the manufacturing process, this contributes to the relatively large manufacturing costs of the containers, particularly as the raw material prices for the thermoplastic plastic materials which are used have risen considerably in the meantime and will rise further.

It is the object of the present invention to provide a method of manufacturing containers, which consist of a stiff outer container and a readily deformable inner bag, in which the manufacturing costs are reduced.

This object is solved in accordance with the invention by the features of claim 1.

Advantageous embodiments of the invention are characterised in the dependent claims.

DETAILED DESCRIPTION OF THE INVENTION

Figure 1:
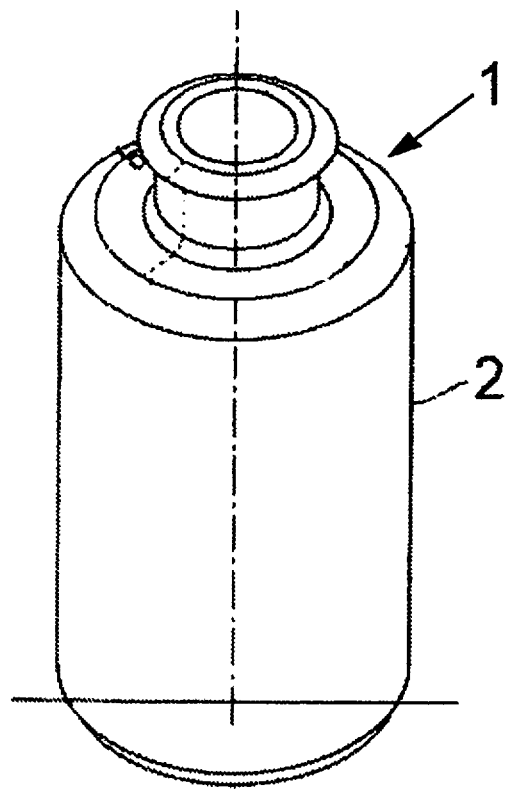
FIG. 1 is a perspective view of a container made by the method of manufacturing.
Figure 2:
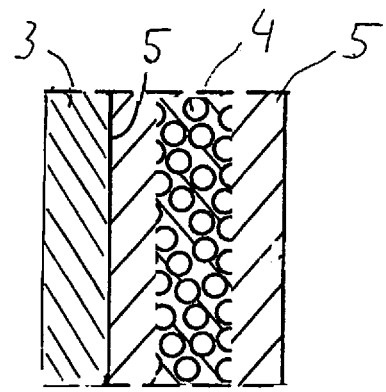
FIG. 2 is a detailed cross-section of the container of FIG. 1.

FIG. 1 and FIG. 2 show a container formed with the present method of manufacture. The assembled container 1 consists of a stiff outer container 2 and a deformable inner bag 3. The wall of the outer container 2 consists of a middle layer 4 of reused material and on both sides outer layers 5 are formed of virgin material.

The invention provides that the excess material is supplied again to the first screw conveyor, which mixes the excess material with the first thermoplastic plastic material and supplies it to the extruder nozzle, wherein the first thermoplastic plastic material, which is virgin material, has a lower viscosity in the molten state than the reused excess material so that the outer layer 5 of the extruded tube consists exclusively of the first thermoplastic plastic material. It transpires surprisingly that a middle layer 4 is formed in the extruded tube from the excess material and on both sides of it outer layers 2 are formed from the first thermoplastic plastic material due to the different viscosities so that no excess material is exposed on the outer layer 5 of the extruded tube. Thus after removal of the inflated preform from the blow mould and cooling of the preform, the inner bag 3 may be completely detached from the wall of the outer container 2, precisely as is the case when only virgin material had been used for both layers of plastic material. As a result of this re-use of the squeezed out excess material, the amount of the virgin material of the first thermoplastic plastic material which is used can be significantly reduced, whereby the manufacturing costs of the container decrease significantly.

The two thermoplastic plastic materials are preferably supplied to the respective screw conveyors in the form of granulates.

The excess material can be supplied again to the first screw conveyor in untreated form so that the manufacture occurs in an on-line process. The excess material can also be comminuted in an additional method step before it is supplied to the first screw conveyor.

In an alternative off-line process, the excess material is collected and processed to form a granulate before it is supplied to the first screw conveyor, which can be a component of a machine operating in parallel.

The method in accordance with the invention is also surprisingly usable if a high proportion of the excess material is used. This proportion of the excess material in the mixture with the first thermoplastic plastic material can be up to 75 wt. %, whereby a proportion of 70 wt. % is particularly preferred. Even with these high proportions of the excess material in the outer container to be formed the excess material on the outer surfaces of the extruded tube is completely covered by the virgin material which is used so that welding to the engaging inner bag does not occur at any point.

PP, PET-G, PCTG, PA and HDPE are preferably used as the materials for the outer container whilst the inner bag can preferably consist of Lupolen or Surlyn. The inner bag can, however, also consist of two or three layers, for instance EVOH, an adhesion promoter layer, an ionomer or LDPE. The invention is not limited to the use of the aforementioned materials.

The invention provides that in the manufacture of containers 1, which can have an outer container 2 with a wall thickness of only 1 to 1.5 mm, this outer container can be formed mostly from excess material squeezed out in the preceding manufacturing cycle, wherein the excess material is completely surrounded externally by virgin material used in a substantially lesser amount so that the excess material is at no point exposed on the outer surface of the extruded plastic tube.

The invention claimed is:

1. A method of manufacturing containers consisting of:
   supplying a first thermoplastic plastic material for a first outer container to a first screw conveyor and a second thermoplastic plastic material for a first inner bag to a second screw conveyor, wherein the first screw conveyor and the second screw conveyor are connected to an extruder nozzle;
   co-extruding a first preform consisting of two tubes using the extruder nozzle, wherein the two tubes are arranged between open halves of a blow mold, and wherein when the first preform has a predetermined length for a container to be manufactured, the blow mold is closed;
   recovering excess material in a base region of the container to be manufactured from the first thermoplastic plastic material of the first outer container, in which a welded base seam of the first inner bag is clamped and held in the axial direction;
   inflating the first preform by a pressure medium into engagement with a wall of the blow mold and removing the first preform from the blow mold, whereafter the first inner bag is detached from the first outer container since the first outer container and the deformable first inner bag do not form a weld connection with one another;
   supplying the excess material which contains the first and second thermoplastic materials to the first screw conveyor, which mixes the excess material with the first thermoplastic plastic material resulting in a mixed material, wherein the first thermoplastic plastic material has a lower viscosity in a molten state than the excess material so that outer layers of a resulting extruded tube consist only of the first thermoplastic plastic material; and
   co-extruding a second preform consisting of a first tube and a second tube using the extruder nozzle, wherein the first tube and the second tube are arranged between the open halves of the blow mold, the first tube including the outer layers of the first thermoplastic plastic material and a middle layer of the mixed material that is between the outer layers and the second tube including the second thermoplastic plastic material for a second inner bag, inflating the second preform by the pressure medium into engagement with the wall of the blow mold and removing the second preform from the blow mold, whereafter the second inner bag is detached from a second outer container since the second outer container and the second inner bag do not form a weld connection with one another.

2. The method as claimed in claim 1, wherein the first and second thermoplastic plastic materials are supplied to the screw conveyors in the form of granulates.

3. The method as claimed in claim 1, wherein the excess material is supplied again to the first screw conveyor in untreated form.

4. The method as claimed in claim 1, wherein the excess material is comminuted before the excess material is supplied to the first screw conveyor.

5. The method as claimed in claim 1, wherein the excess material is processed into a granulate before the mixed material is supplied to the first screw conveyor.

6. The method as claimed in claim 1, wherein the proportion of the excess material in the mixed material is ≤75 wt. %.

7. The method as claimed in claim 1, wherein PP, PET-G, PCTG, PA or HDPE is used as the material for the first or second thermoplastic plastic materials.

* * * * *